Nov. 24, 1925.
C. F. HANSON
KETTLE STAND
Filed Aug. 27, 1924
1,562,758
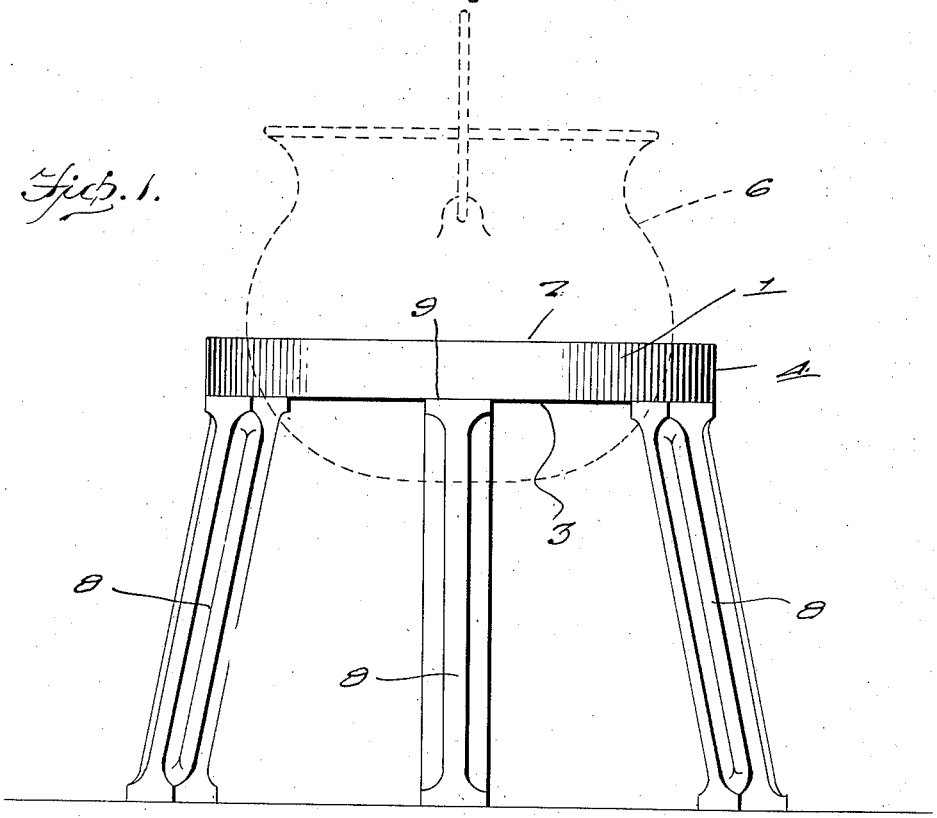
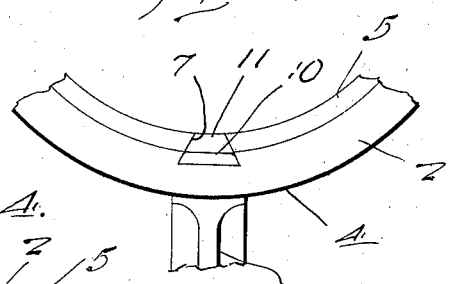
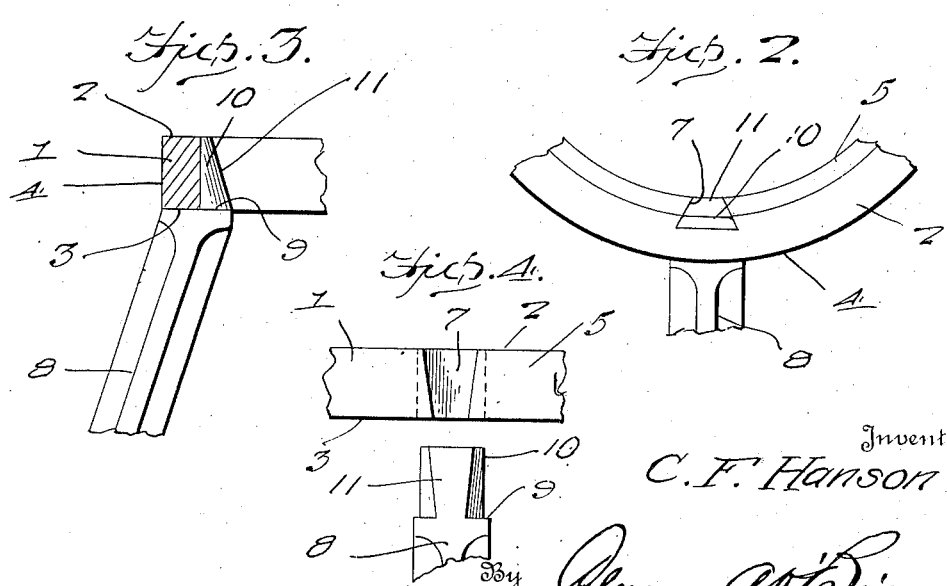
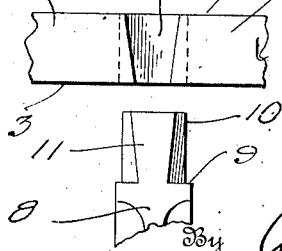
Inventor
C. F. Hanson
By Clarence A. O'Brien
Attorney Patented Nov. 24, 1925.

1,562,758

UNITED STATES PATENT OFFICE.

CLAUD F. HANSON, OF AUBURN, INDIANA.

KETTLE STAND.

Application filed August 27, 1924. Serial No. 734,466.

*To all whom it may concern:*

Be it known that I, CLAUD F. HANSON, a citizen of the United States, residing at Auburn, in the county of De Kalb, and State of Indiana, have invented certain new and useful Improvements in a Kettle Stand, of which the following is a specification.

This invention relates to improvements in kettle stands.

An object of the invention resides in providing a kettle stand especially adapted for use for camping purposes and the like where it is desired to heat water or cook food in kettles over an open fire.

A further object of the invention resides in providing a kettle stand including a ring having a beveled or frustro conical inner surface adapted to receive and support the bottom portion of a kettle therein, which is provided with a plurality of recesses adapted to receive extensions formed on the ends of supporting legs so that said legs will be removably connected to said ring for supporting the same and a kettle adapted to be positioned therein above a fire.

A further object of the invention consists in providing a ring member having a frustro-conical inner surface adapted to receive the bottom portion of a kettle or caldron, such ring being provided on the inner side with a plurality of dove tailed recesses for slidably receiving dove tailed projections arranged in angular relation on the ends of legs for removably connecting said legs to said ring so that the ends will contact with the bottom of the ring and diverge downwardly and outwardly therefrom for supporting said ring and a kettle carried thereby over an open fire or the like.

The invention also includes other objects and improvements in the details of construction and arrangement of the parts which are more particularly pointed out in the following detailed description and in the claim directed to a preferred form of the invention, it being understood however that various changes in the minor details and arrangement of the parts of the construction may be made within the scope of the invention as described and claimed.

In the drawing forming part of this application:

Figure 1 is a side elevation of the improved kettle stand construction constructed according to this invention and showing a kettle supported therein in dotted lines.

Figure 2 is a plan view of one portion of the ring showing the manner of connecting one of the legs therewith.

Figure 3 is a vertical sectional view through a portion of the ring formed with a slot for receiving a leg, the leg being shown in elevation.

Figure 4 illustrates the position of the projection on the end of the leg before the same is inserted into the ring, illustrating the parts in position for the insertion of the leg into said ring.

The numeral 1 indicates a ring member having parallel upper and lower surfaces 2 and 3 respectively, a cylindrical outer periphery 4 and a frustro-conical inner surface 5. The frustro-conical inner surface is adapted to form a support in the ring to receive the outer lower surface of a kettle indicated at 6 in dotted lines in Figure 1 for effectively supporting the same therein and at the same time permitting its ready removal without sticking of the kettle to the ring member.

The inner side of the ring is formed at predetermined spaced intervals with recesses 7 opening through the face 5 as illustrated in Figures 2 and 3 which are of dove tailed section in horizontal section and which extend through from the bottom face to the upper face of said ring in a manner as illustrated in Figures 3 and 4. A plurality of legs are indicated at 8, the upper ends of which are beveled as indicated at 9 so as to be arranged in angular relation to the axis of the legs, and from which project the extensions 10 of dove tailed sections adapted to fit slidably in the recesses 7 in the ring for locking cooperation therewith, the inner side of the projection 10 being beveled as indicated at 11 to conform to the bevel of the inner face 5 of the ring when said projections are in position in the recess 7 thereof in the manner as clearly illustrated in Figures 2 and 3. The arrangement of the projections 10 on the legs is such that when they are positioned on the bottom of the ring member they will project downwardly and diverge relatively to each other from said ring member so as to support the same in a substantially horizontal position above the surface of the ground in order that the kettle 6 will be supported over a fire. In positioning the legs on and in connection with the ring member 1 it will be noted that the upper inclined ends 9 of the legs engage the bottom surface 3 of the ring member and thereby provide a rigid support for the ring and the kettle 6. The extensions 10 are positioned at the inside of the ring and have the beveled surfaces 11 flush with the inner surface 5 of the ring so that when the kettle is positioned therein the legs will be effectively locked in connection with said ring member.

From the foregoing description it will be thus seen that a novel and simple form of kettle support has been provided for use in connection with open fires such as camp fires and the like wherein the parts of the same are readily engaged or disengaged so that a simple and efficient support for a caldron or other kettle is provided over the fire which will do away with the usual pole support now in vogue.

Having thus described the invention, what I claim as new is:—

A kettle stand of the class described including a ring member having parallel upper and lower surfaces, and the inside of said ring member having a frustoconical inner surface, the inside of said ring being formed at intervals with a plurality of dove-tailed recesses opening through said inner surface and extending from the upper and lower surfaces, and a plurality of legs having offset end portions of dove-tailed formations adapted for sliding cooperation with the recesses in said ring member and shoulders formed on the ends of the legs adjacent the offset end portions on which rests the under surface of the ring member, the inner surfaces of the end portions of the legs being flush with the inner surface of the ring when disposed in the recesses.

In testimony whereof I affix my signature.

CLAUD F. HANSON.